United States Patent
Kanan

(10) Patent No.: US 6,382,337 B1
(45) Date of Patent: May 7, 2002

(54) SNOWMOBILE SUSPENSION WELL SKIRT STRUCTURE

(76) Inventor: Ronald C. Kanan, P.O. Box 649, Aspen, CO (US) 81612

( * ) Notice: Subject to any disclaimer, the term of this patent is extended or adjusted under 35 U.S.C. 154(b) by 0 days.

(21) Appl. No.: 09/518,556

(22) Filed: Mar. 3, 2000

Related U.S. Application Data

(63) Continuation-in-part of application No. 08/979,753, filed on Nov. 26, 1997, now Pat. No. 6,039,136.

(51) Int. Cl.⁷ ............................................... B62M 27/02
(52) U.S. Cl. ........................................ 180/182; 280/848
(58) Field of Search .................................. 280/851, 849, 280/848, 847; 150/166; 296/198; 180/182, 190

(56) References Cited

U.S. PATENT DOCUMENTS

| | | | |
|---|---|---|---|
| 871,907 A | 11/1907 | Bertram | |
| 2,735,690 A | 2/1956 | Paden et al. | |
| 3,482,849 A | 12/1969 | Puetz | |
| 3,645,347 A | 2/1972 | Brant | |
| 3,692,130 A | * | 9/1972 | Stacy, Jr. |
| 3,719,369 A | 3/1973 | Savage | |
| 4,291,892 A | 9/1981 | Berthold et al. | |
| 4,390,151 A | 6/1983 | Schneider | |
| 4,393,953 A | 7/1983 | Boulianne | |
| 4,620,604 A | 11/1986 | Talbot | |
| 4,671,521 A | 6/1987 | Talbot et al. | |
| 5,109,941 A | 5/1992 | Thompson | |
| 5,458,945 A | * | 10/1995 | Tall |
| 5,632,223 A | * | 5/1997 | Bray et al. |
| 5,944,380 A | * | 8/1999 | Atherley |

* cited by examiner

Primary Examiner—Kevin Hurley
(74) Attorney, Agent, or Firm—Dorsey & Whitney LLP

(57) ABSTRACT

A suspension well covering device for use with a snowmobile, the snowmobile including a cowling defining a belly pan and a suspension well, the suspension well defining an opening through which a suspension system extends outwardly. The suspension well covering device includes a skirt adapted to be attached to the cowling to substantially cover the opening in the suspension well.

3 Claims, 8 Drawing Sheets

SNOWMOBILE SUSPENSION WELL SKIRT STRUCTURE

This Application is a C-I-P of Ser. No. 08/979,753 filed Nov. 26, 1997, U.S. Pat. No. 6,039,136.

FIELD OF THE INVENTION

The present invention relates to the field of suspension systems for snow vehicles. More particularly, the present invention relates to a snow exclusion component of the suspension system that provides improved performance of the suspension system by reducing or eliminating snow from packing into the suspension wells.

BACKGROUND OF THE INVENTION

Snowmobiles are typically used for travel over snow. Generally, a snowmobile includes a tread on the lower rear of the snowmobile that is driven by an engine, and two skis attached to the lower front of the snowmobile that provide steering and support for the snowmobile. The tread rotates around a series of suspension wheels thereby gripping the snow and moving the snowmobile. The skis are linked to a suspension system that absorbs the impact when a ski hits a hard surface. The suspension system also provides the necessary linkage to couple the skis to a handlebar and therefore allow a snowmobiler to steer the snowmobile. This type of snowmobile is generally shown in U.S. Pat. No. 5,109,941.

Oftentimes snowmobiling is done in deep snow, which presents problems for existing snowmobiles when snow becomes packed into the suspension wells. In deep snow, especially powdery snow, the front of the snowmobile can bog down when the front skis are unable to suspend the front of the snowmobile on the snow. This happens, in part, when snow becomes packed into the wheel wells increasing the weight of the front of the snowmobile and increasing the resistance of the front of the snowmobile.

Having snow packed into the suspension wells also significantly interferes with the snowmobiles suspension system. The suspension wells allow the snowmobile's suspension components to move as needed through their normal range of motion without interference. The movement of the suspension components is significantly hampered when a large quantity of snow becomes packed into the suspension well. This problem is exacerbated when the snow packed in the suspension wells turns to ice as a result of the heat from the engine.

The inside of the suspension well is typically the outer wall of the snowmobile's engine housing. Accordingly, the suspension well is heated-up during use from emitted engine heat causing the snow adjacent the wall to melt and subsequently freeze into ice away from the wall. Oftentimes the icing occurs on or about the suspension system components. A significant build-up of ice also occurs when the snowmobile is parked allowing the engine to cool and the wet snow to freeze. This combination of packed snow and ice formation can lead to significant interference with the movement of the suspension system.

Accordingly, there exists a need for a snowmobile that reduces or eliminates snow from entering the snowmobile's suspension wells. It is against the backdrop of problems associated with snow entering the suspension wells, as discussed above, that the present invention was developed.

SUMMARY OF THE INVENTION

The present invention solves the problems described above. In general, the instant invention is for a suspension well covering device for use with a snowmobile, the snowmobile including a cowling defining a belly pan and a suspension well, the suspension well defining an opening through which a suspension system extends outwardly. The suspension well covering device including a skirt adapted to be attached to said cowling and to substantially cover said opening in said suspension well.

The skirt structure extends from the housing and extends over the suspension extending from the suspension well, and attaches to the auxiliary ski. The skirt has apertures to allow the suspension structure to extend therethrough, so as to not interfere with the operation of the suspension. The skirt structure keeps most, if not all, of the snow out of the suspension well. The skirt can be removable, and can be made of a variety of fabrics and materials for its intended purpose.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENT

Figure 1:
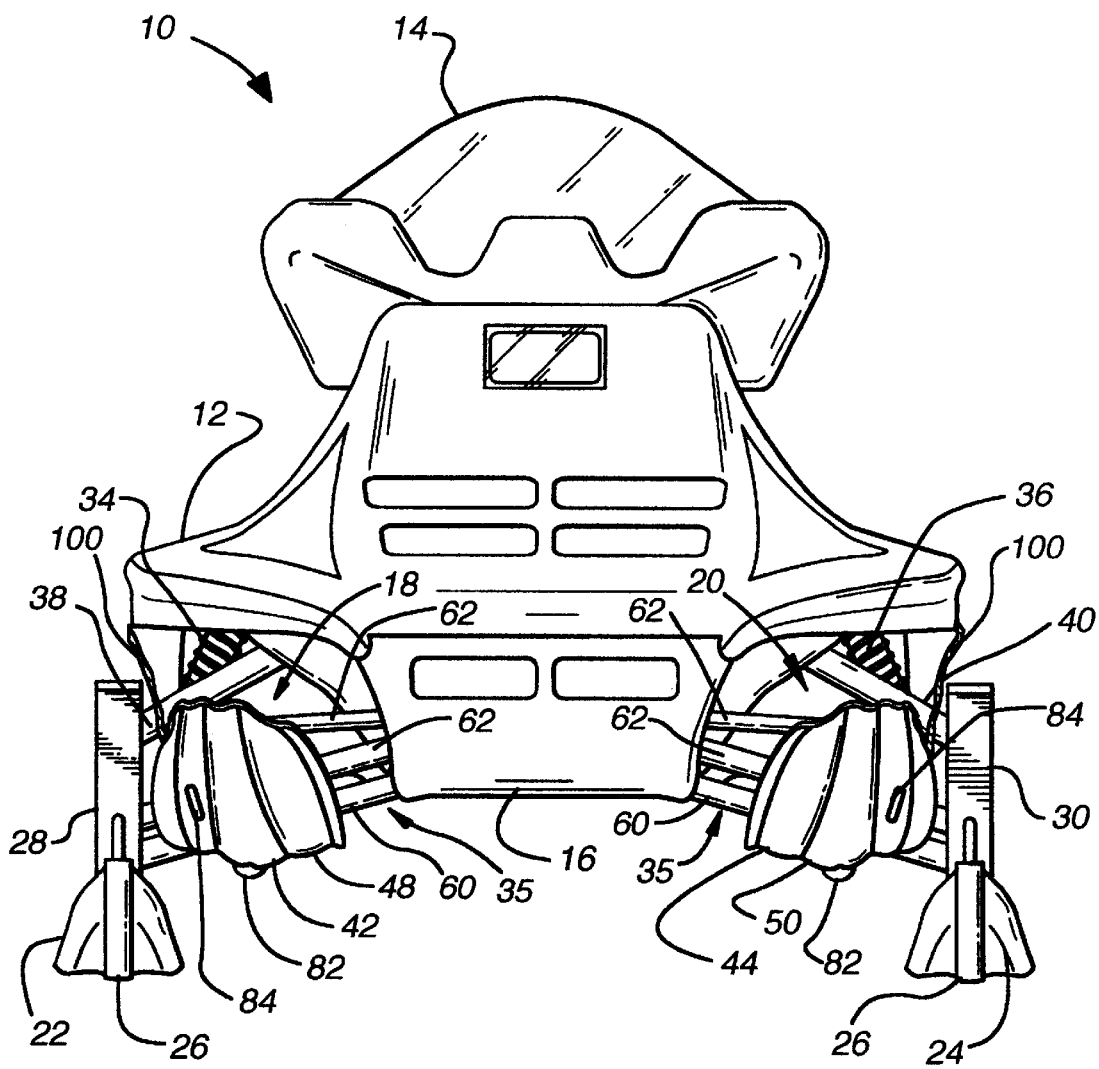
FIG. 1 is a front view of a snowmobile utilizing an embodiment of the suspension well skirt of the present invention.

A snowmobile 10, viewed from the front end, is generally shown in FIG. 1. The snowmobile 10 has a front cowling 12 which provides a variety of functions including acting as a hood to cover the engine, and protecting a snowmobiler riding the snowmobile 10 from the wind. The cowling 12 is typically made of a stiff, durable polymeric or composite material.

Situated at the top of the cowling 12 is a windshield 14 that also protects the snowmobiler from the wind and provides safety to the snowmobiler. The windshield 14 is typically a transparent shatterproof type of acrylic material. The windshield 14 is positioned in front of the handlebars (not pictured), which provide the steering control for the snowmobile 10.

The bottom or "belly pan" 16 of the cowling 12 is a primary contact point where the snowmobile 10 might become bogged down in deep snow. Additionally, snow may also be compacted in the suspension wells 18, 20 when the snowmobile is operated in deep snow.

A pair of skis 22, 24, as shown in FIG. 1, are typical for current snowmobiles. The skis 22 and 24 are linked to the handlebars and thereby provide steerability for the snowmobile 10, as well as support for the front end of the snowmobile 10 on the snow. The primary skis 22 and 24 are usually ribbed along their length to increase the handling characteristics of the snowmobile 10. Oftentimes the skis 22 and 24 include carbide runners 26 along their length to protect the bottoms of the skis 22, 24 from hard surfaces, such as rocks, pavement or the like. The skis 22 and 24 are secured to linkage brackets 28 and 30 respectively. The linkage brackets 28 and 30 are secured to the shock-absorbing features 34, 36 (only partially shown). The struts 38 and 40 secure the skis 22 and 24 and associated linkage brackets 28 and 30 to the main chassis of the snowmobile 10. In addition, the struts 38, 40, linkage brackets 28, 30, and shock absorbing features generally make up the suspension system 35.

The suspension system 35 shown in the attached drawings is just one example of a suspension system that could be used for the present invention. The type of suspension system 35 used for the skis 22, 24 of the present invention is not a limiting factor, and any type of suspension system which provides some type of flex, absorption, and steering for the skis 22, 24 is envisioned for the present invention. The shock-absorbing suspension system may include coiled springs, hydraulic pistons and cylinders, leaf springs, or any other type of system which provides flex and/or impact absorption to a ski.

Skis 42 and 44, also referred to as "auxiliary skis" herein, are floatation skis, as described in U.S. patent application Ser. No. 08/979,753, filed Nov. 26, 1997 to the instant inventor, hereby incorporated by reference in its entirety. The auxiliary skis 42 and 44 improve the snowmobile's performance by reducing the amount of snow packing into the suspension wells 18, 20 and by providing additional lift to the front of the snow mobile in deep snow. The suspension well skirt 100 of the present invention also works to reduce or eliminate snow from entering the suspension wells 18, 20. The suspension well skirts 100 can act alone or in conjunction with the auxiliary skis as described in more detail below.

The auxiliary skis 42, 44 help to prevent or reduce the amount of snow packing into the suspension wells 18 and 20. As the snowmobile 10 travels across deep snow, snow tends to get packed in the suspension wells 18 and 20 of the snowmobile. As the snow fills the wells 18 and 20, and as the snowmobile 10 continues to travel through the snow, the packed wells 18 and 20 provide increased resistance to the movement of the snowmobile 10 through the snow. This increased resistance slows down the snowmobile 10 in the deep snow. Additionally, the responsiveness of the steering of the snowmobile 10 diminishes due to increased drag of the snowmobile 10 through the deep snow. The increased drag reduces performance and can cause the snowmobile to bog down or become completely stuck.

As can be seen by the location and size of the auxiliary skis 42 and 44, the skis 42 and 44 are positioned to reduce the amount of snow that enters the suspension wells 18 and 20 of the snowmobile 10. When the snow hits the front upraised portions 46 of skis auxiliary 42 and 44, the snow is either deflected, or compressed downward, thus allowing the snowmobile 10 to pass on top of the snow. Accordingly, the amount of snow packing into the suspension wells 18, 20 of the snowmobile 10 is significantly reduced.

The auxiliary skis 42, 44 also create additional lift to help the snowmobile stay on top of the deep snow, thus minimizing slow-down of the snowmobile. The auxiliary skis 42 and 44 effectively increase the surface area of the front end of the snowmobile in contact with deep snow, and thus support the front end above the surface of the snow. The surface engaging portions 48 and 50 of the auxiliary skis 42 and 44 are in a plane above the primary skis 22 and 24, and thus do not contact the snow surface except when in deep snow.

Figure 2:
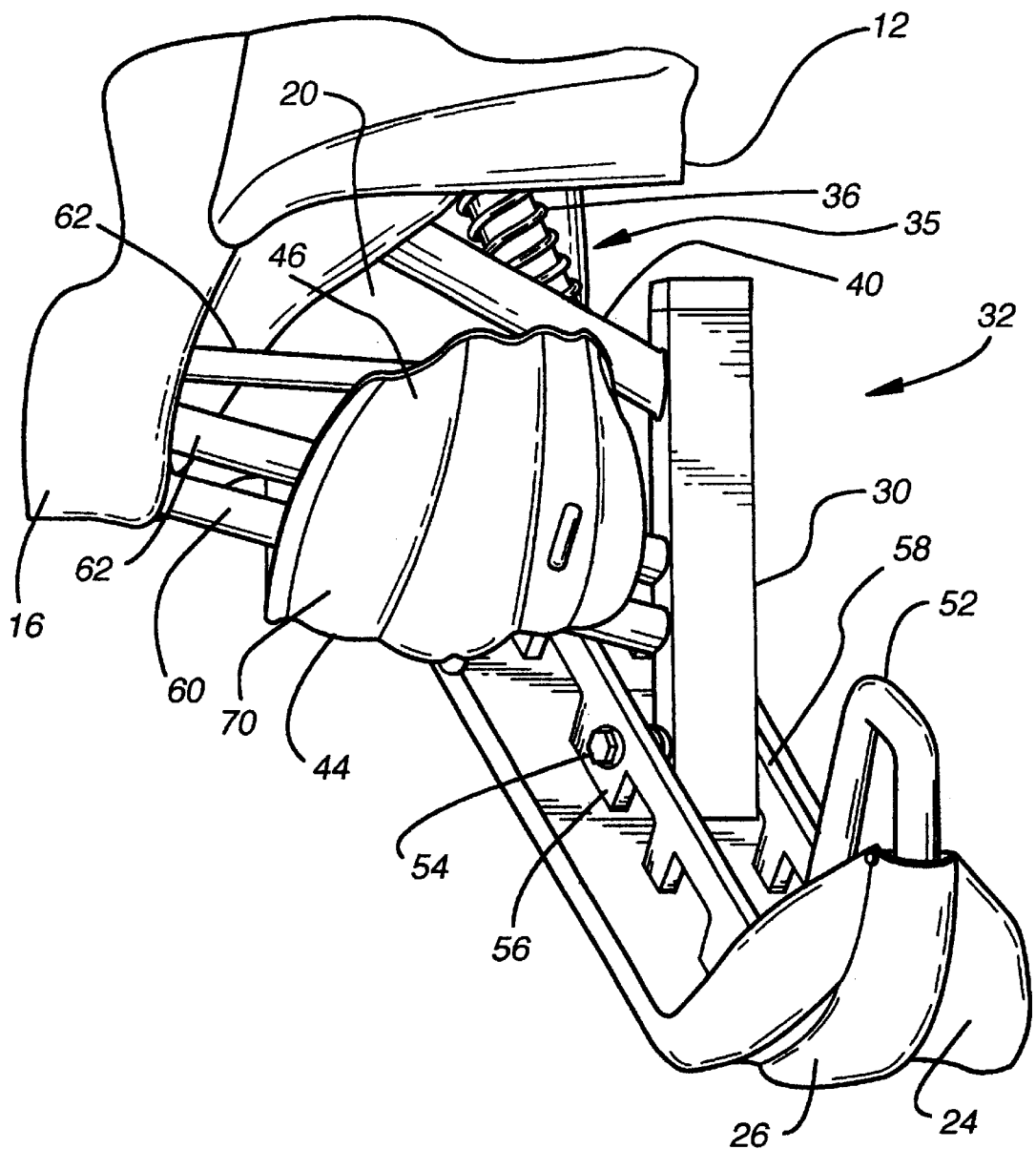
FIG. 2 is a close up of the left suspension well and left suspension system with auxiliary ski.

FIG. 2 is an isolated view of the front left side of the snowmobile 10 shown in FIG. 1. Ski 24 is shown with a handle 52 projecting therefrom. The handle 52 allows the snowmobiler to maneuver the snowmobile when it is off or idling. Linkage 30 is shown secured to ski 24 by bolt 54. This linkage 30 is secured to the ski 24 by brackets 56 and 58. These brackets are typically found on primary skis of snowmobiles and function as an extension from ski 24. The specifics of how primary ski 24 is secured to snowmobile 10 is not critical to the present invention. The term "primary ski" is meant to denote the skis (22 and 24) mounted on the front of the snowmobile which act to steer and support the snowmobile 10. There can be numerous mechanisms whereby the ski 24 is secured to the snowmobile 10.

Strut 40 is also shown in a preferred position for a strut. However, as discussed above, the suspension system 35 for the skis 22 and 24 disclosed herein are merely one example of virtually hundreds of different types suspension systems that could be used with the present invention. Additional struts 60 and 62 are part of the suspension system 35 for attaching and supporting the ski 24 on the snowmobile, as well as being part of the steering linkage between the handlebars and the primary ski 24. These struts can be in any of a variety of configurations, and the auxiliary ski 44 of the present invention is mountable on these various configurations.

Figure 3:
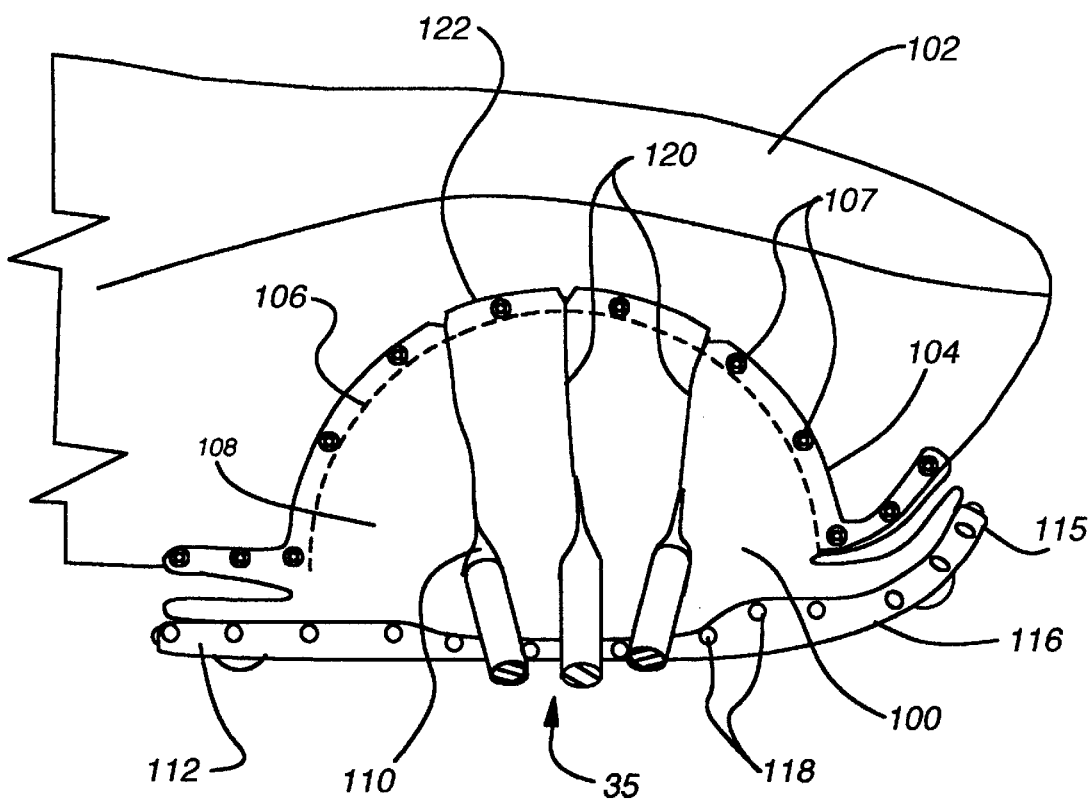
FIG. 3 is a side view of the right suspension well of a snowmobile utilizing an embodiment of the suspension well skirt of the present invention.

The struts 38, 40, 60 and 62 extend out of the suspension wells 18, 20 of the snowmobile 10. The suspension wells 18, 20 typically extend vertically from the side of the cowling 12 to the underlying belly pan 16. The suspension wells 18, 20 typically extend longitudinally along the snowmobile from the front of the snowmobile rearwardly as shown in FIGS. 1 and 2. The suspension wells 18, 20 may, however, extend discretely starting from just behind the front of the snowmobile as shown in FIG. 3. Typically, the inside walls of the suspension wells 18, 20 are also the outer walls of the engine housing. Thus, the inside walls of the suspension wells 18, 20 become warm when the snowmobile 10 is running.

The suspension well 18, 20 allow the suspension system 35, including the struts 38, 40, 60 and 62, and the shock absorbing features 35, 36, to move upwardly and downwardly as needed through their normal range of motion without interference. The suspension wells 18, 20, however, as discussed above, often become packed with snow during use. The packed snow and ice significantly interferes with the movement of the suspension 35.

The suspension well skirt structure 100 of the present invention, as shown in FIGS. 1, 3–6, and 9–10, works to reduce or eliminate snow from entering the suspension well. The skirt 100 can act alone or in conjunction with the auxiliary skis 42, 44 as mentioned above.

Figure 4:
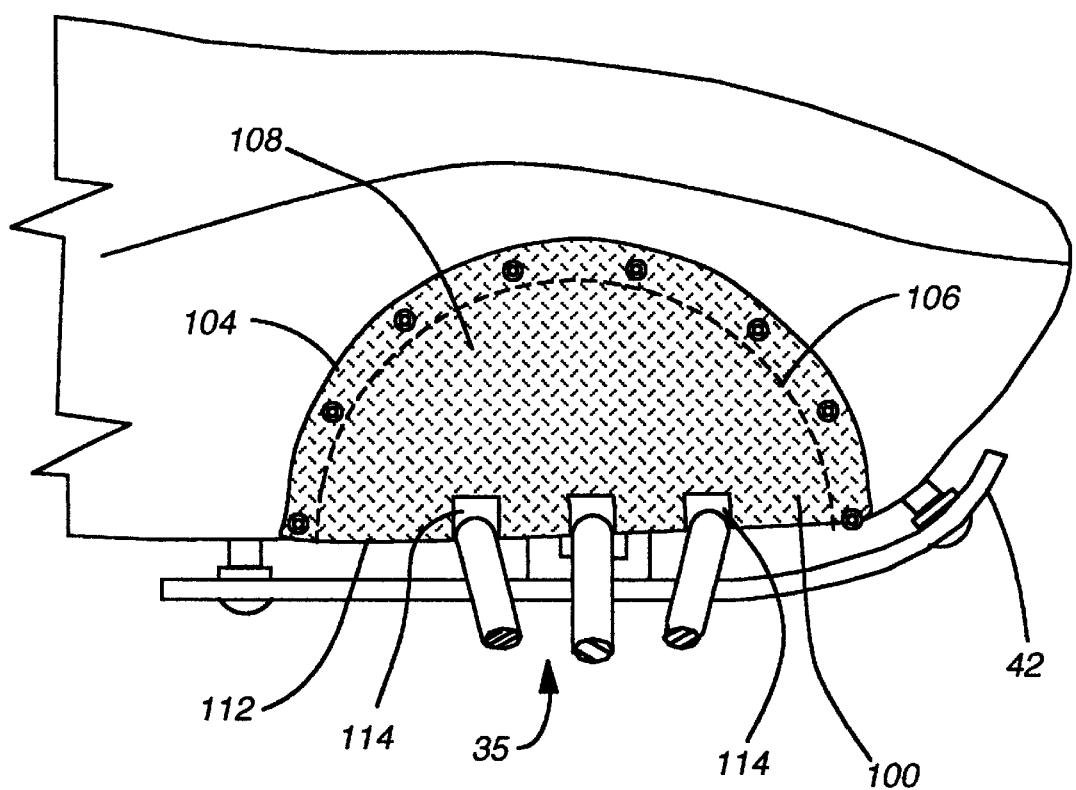
FIG. 4 is a side view of the right suspension well of a snowmobile utilizing an embodiment of the suspension well skirt of the present invention.

In general, the skirt 100 attaches to the cowling 102 along the perimeter 104 of the suspension well 106 and extends over the suspension well opening 108. Note, the primary skis 22, 24 are riot shown in FIGS. 3–6 and 8–10 to more clearly show the skirt 100. The skirt 100 includes an aperture 110 to allow the suspension components 35 to extend therethrough, which allows the suspension 35 to move up and down without interference from the skirt 100. The bottom edge 112 of the skirt 100 can be attached to the outer edge 116 of any of the before discussed embodiments of the floatation ski 42, 44, and 150, discussed hereinafter, regardless of the ski's attachment location to the snowmobile, i.e., ski attached to the suspension system components 35 or to the belly pan. The skirt 100 is also useful in the absence of a floatation ski where the bottom edge 112 of the skirt 100 would simply hang freely as shown in FIG. 4. When the skirt 100 hangs freely, it is preferable for the skirt 100 to define slots 114 at its bottom edge 112, thereby allowing for the free movement of the snowmobile's suspension system 35 without interference from the skirt 100.

The skirt is preferably made of any material that remains flexible at relatively low temperatures, such as certain vinyls, plastics, leather, cloth, canvas or other suitable material. The skirt 100 is attached along the perimeter 104 of the suspension well 106 either permanently, such as by rivets 107, or releasably, such as by snaps or by a hook-and-loop type fastener, such as VELCRO®. The attachment of the skirt 100 to the perimeter 104 of the suspension well 106 should be relatively strong, even when a releasable attachment is contemplated, to withstand the force of impact with the snow and other objects. The skirt 100 is positioned so as to cover the suspension well 106, and particularly the suspension well opening 108, to allow the suspension 35 to extend therethrough, and to keep snow from entering the suspension well 106.

Figure 5:
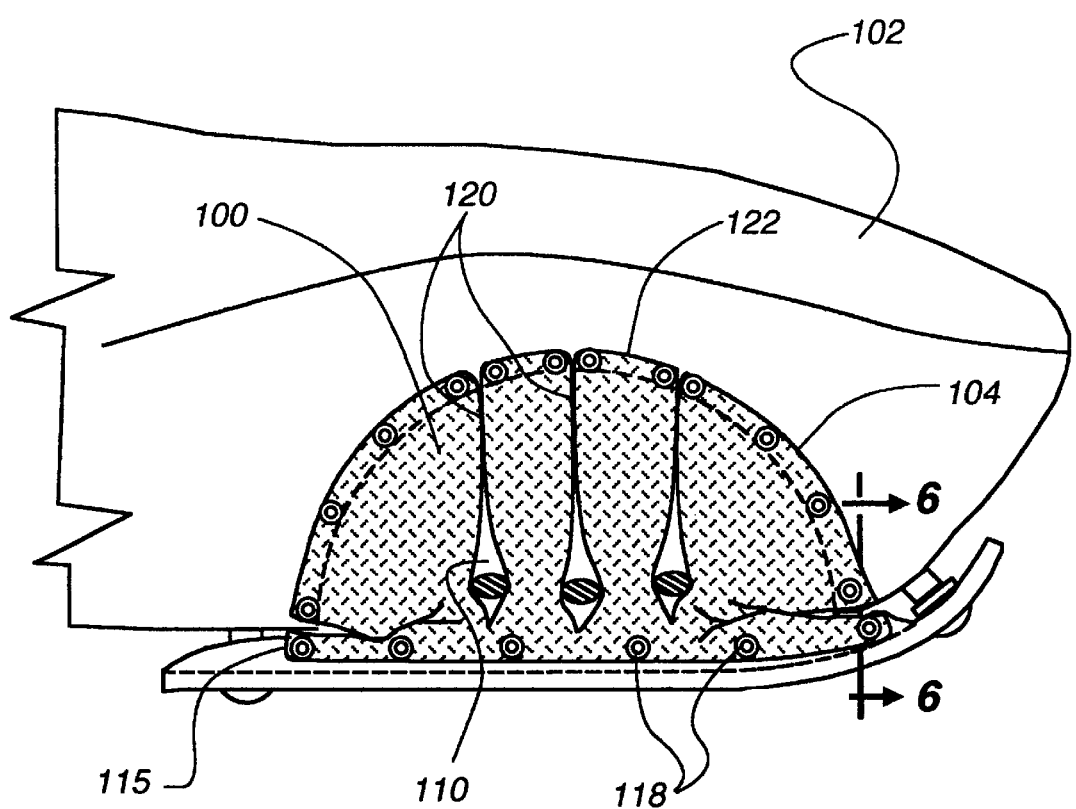
FIG. 5 is a side view of the right suspension well of a snowmobile utilizing an embodiment of the suspension well skirt of the present invention.

As shown in FIGS. 3 and 5, one example of the skirt 100 is attached along part of the top outer perimeter 104 of the suspension well 106 and extending downwardly to the outer edge 115 of the floatation ski 116. In this example the skirt 100 attaches to the outer edge 115 of the floatation ski 116 by snaps 118. As discussed previously, the floatation ski can move freely with the suspension system 35, thus, the skirt 100 must be sized to allow the floatation ski 116 to move up and down without causing the release of the snaps 118 either along the top perimeter 104 of the suspension well 106 or along the floatation ski 116 due to such movement. As discussed above, the skirt 100 may be attached by snaps 118, by rivets or by a hook and loop type fastener, such as VELCRO®.

As shown in FIGS. 3 and 5, the aperture 110 formed in the skirt 100 allows the suspension system 35 to extend through the skirt 100, and is sized to allow the suspension 35 to move and up and down without interference by the skirt 100. It is envisioned that there can be a single aperture (not shown) to facilitate the rods extending through the skirt or there can be several apertures to accomplish this task, as shown in FIGS. 3–5 and 9. One elongated aperture would allow more free movement of the suspension 35, and several apertures (e.g., one for each strut) would allow more protection against the snow entering the suspension well.

To allow the skirt 100 to be attached and removed from its location on the snowmobile 10, a slit 120 is formed in the skirt, such as from the aperture 110 to the top 122 or bottom edge 112 of the skirt 100. The slit 120 can be opened to allow the suspension 35 to be placed through the aperture 110. The slit 120 can be closed (by snaps or VELCRO®, etc.) to provide the desired coverage of the suspension well 106, and to allow the skirt 100 to be removed. Each aperture 110 will require the slit 120 for proper placement of the skirt onto the well.

Figure 6:
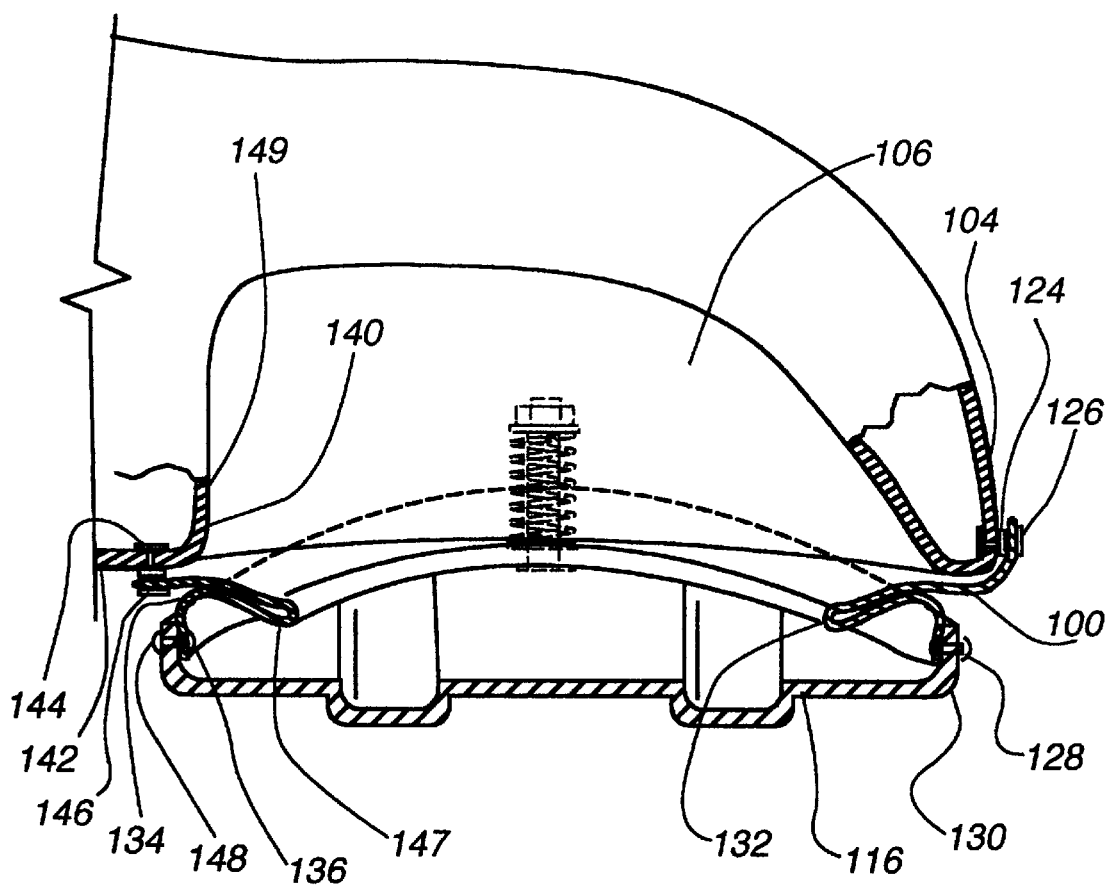
FIG. 6 is a section view taken along line 6–6 of FIG. 5.

FIG. 6 is a sectional view of the suspension well skirt 100 taken along lines 6—6 of FIG. 5 FIG. 6 illustrates several possible means of securing the skirt 100 along the top perimeter 104 of the suspension well 106 and to the auxiliary ski 116. Specifically, the top perimeter 104 of the suspension well 106 has a snap receiving portion 124 embedded in the suspension well 106. A corresponding snap portion 126 in the outside skirt 100 allows the skirt 100 to be snapped to the suspension well 106. Additionally, the skirt 100 can also be snapped or riveted 128 to the outside edge 130 of the auxiliary ski 116. Note that the skirt 100 has extra folded material 132 to allow the movement of the suspension system 35. The skirt 100 keeps snow and debris from entering the suspension well 106 between the outer edge 130 of the auxiliary ski 116 and the top perimeter 104 of the suspension well 106.

Under certain circumstances, it will also be useful to have an additional inside suspension well skirt 134 extending from the interior edge 136 of the floatation ski 116 to the exterior edge 140 of the belly pan 142 in the suspension well 106. The inside suspension well skirt 134 is secured to the belly pan 142 by a series of snap receiving portions 144 embedded in the belly pan 142. A corresponding snap portion 146 in the inside skirt 134 allows the skirt 134 to be snapped to the belly pan 142. Additionally, the inside skirt 134 can also be snapped or riveted 148 to the inside edge 136 of the auxiliary ski 116. As with the skirt 100 described above, the inside skirt 134 has extra folded material 147 to allow movement of the suspension system 35. The inside skirt 134 keeps snow and other articles from entering the suspension well 106 through the gap between the floatation ski 116 and the inside perimeter 149 of the suspension well 106.

Each skirt 100 and 134 is made of the same flexible material. The inside skirt 134, like the corresponding outside skirt 100, is long enough to allow the floatation ski 116 to move up and down as needed without hindrance. The attachment of the skirt 100 and 134 between the floatation ski 116 and the belly pan 142 can be continuous along the length of the floatation ski 116, or can be along any part of the length of the floatation ski 116, as is desired. As is shown in FIG. 6, the inside skirt 134 can be secured to the belly pan 142 and the floatation ski 116 in a similar manner as was described for the outside skirt 100.

Figure 7:
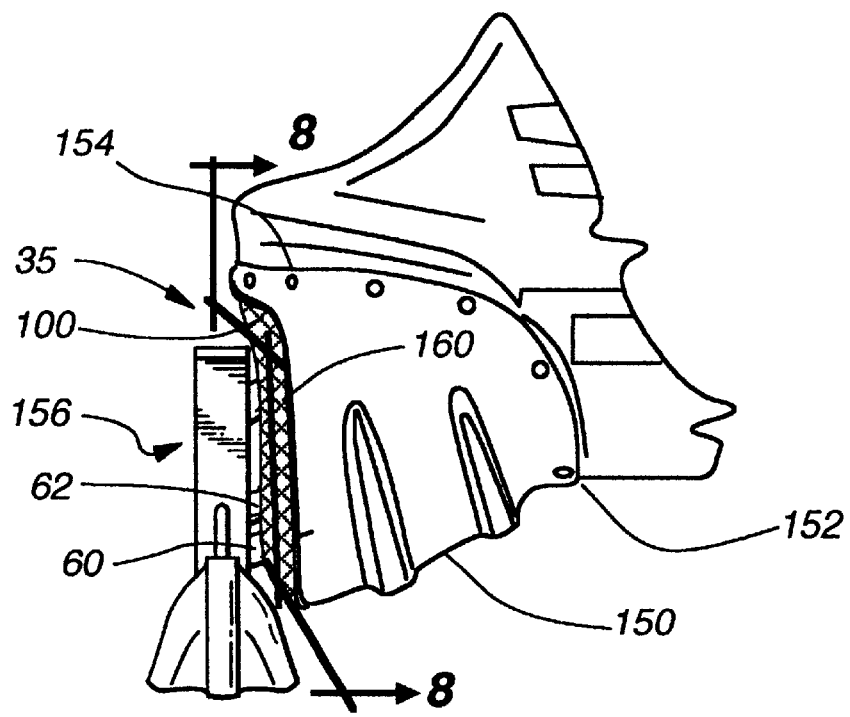
FIG. 7 is a front view of the right suspension well of a snowmobile utilizing an auxiliary ski with a skirt.
Figure 8:
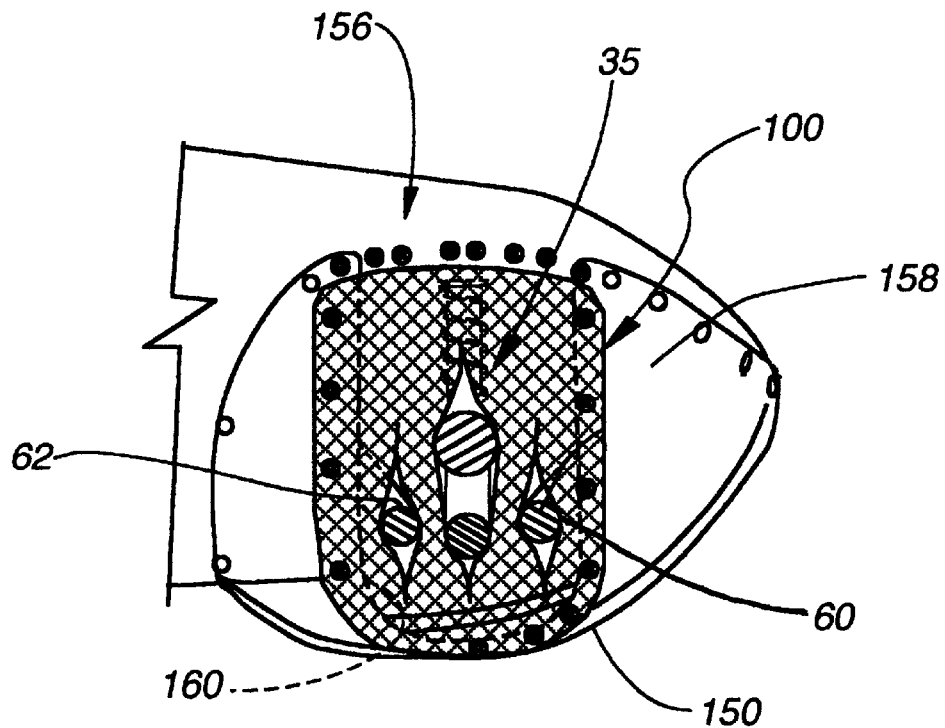
FIG. 8 is a section view taken along line 8–8 of FIG. 7.
Figure 9:
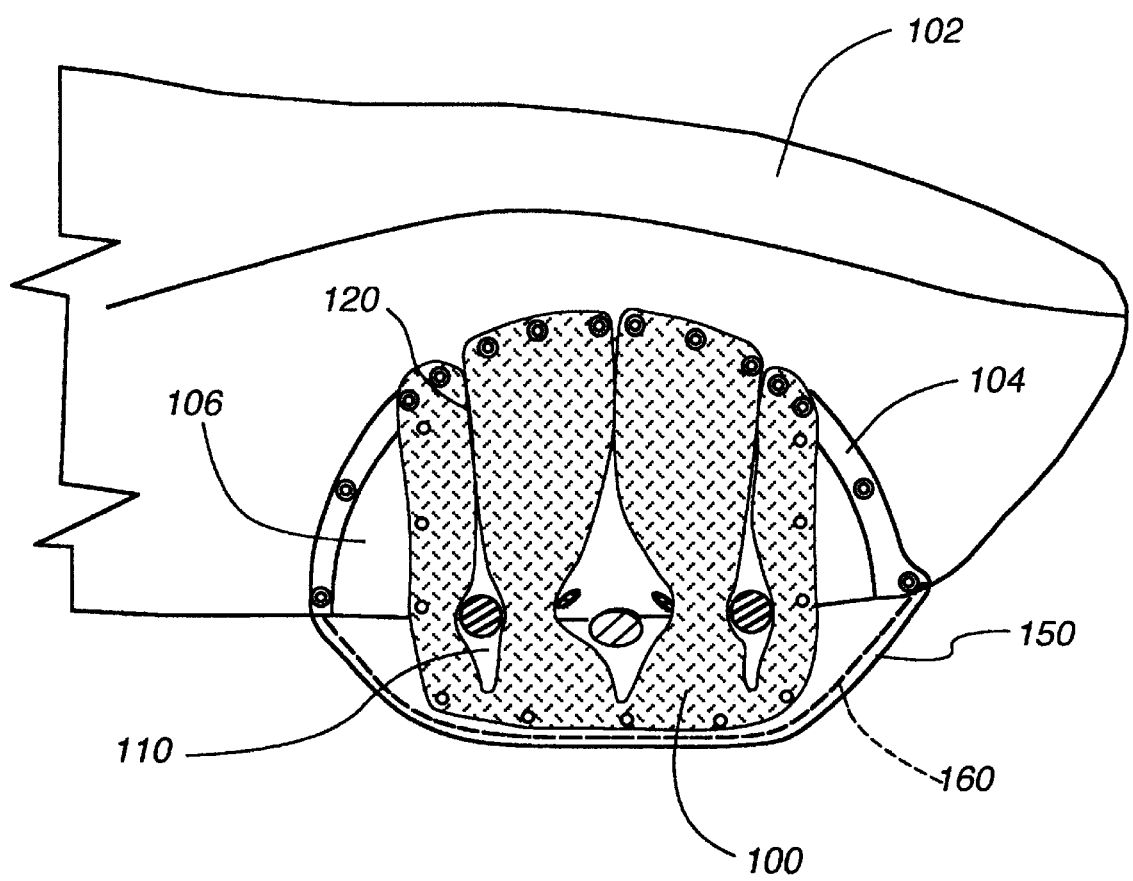
FIG. 9 is a side view of the right suspension well of a snowmobile utilizing an embodiment of the suspension well skirt of the present invention.

As shown in FIG. 9, the outside skirt 100 is also envisioned to attach between the perimeter 104 of the suspension well 106 and the embodiment of the auxiliary ski 150 as shown in FIGS. 7–8. FIG. 7 shows an embodiment of the auxiliary ski 150 that forms a continuous attachment to the belly pan 152 and also attaches along the outside edge 154 of the suspension well 156. As shown in FIGS. 7–9, the auxiliary ski 150 is continuously attached to the belly pan 152, therefore the skirt 100 need only be attached from the outside edge 158 of the auxiliary ski 150 to the portion of the outside edge 154 of the suspension well 156 that is not covered by the auxiliary ski 150. FIG. 8 is a section view taken along line 8—8 of FIG. 7, further showing the auxiliary ski 150. In this case the skirt 100 could replace the need of having a folded-up side wall 158 on the auxiliary ski 150 or, alternatively, could be used to simply cover the groove 160 left in the turned-up ski side wall 158.

While the invention has been particularly shown and described with reference to the preferred embodiments discussed herein, it will be understood by those skilled in the art that various other changes in the form and details may be made without departing from the spirit and scope of the invention. It should be understood that this description has been made by way of example, and that the suspension invention is defined by the scope of the following claims.

I claim:

1. A suspension well covering device for use with a snowmobile, said snowmobile including a cowling defining a belly pan and a suspension well, said suspension well defining an opening through which a suspension system extends outwardly, said suspension well covering device comprising:

a skirt adapted to be attached to said cowling and to substantially cover said opening in said suspension well; and wherein said skirt includes at least one aperture adapted to allow said suspension system to extend therethrough.

2. A snowmobile, said snowmobile including a cowling defining a belly pan and a suspension well, said suspension well defining an opening through which a suspension system extends outwardly, said suspension includes at least one strut and at least one ski, said snowmobile comprising:

a suspension well skirt attached to said cowling, said suspension well skirt adapted to substantially cover said opening in said suspension well; and wherein said snowmobile includes an auxiliary ski having an outside edge and an inside edge, and wherein said suspension well skirt is attached to said outside edge of said auxiliary ski.

3. A snowmobile, said snowmobile including a cowling defining a belly pan and a suspension well, said suspension well defining an opening through which a suspension system extends outwardly, said suspension includes at least one strut and at least one ski, said snowmobile comprising:

a suspension well skirt attached to said cowling, said suspension well skirt adapted to substantially cover said opening in said suspension well;

wherein said snowmobile includes an auxiliary ski having an outside edge and an inside edge, and wherein said suspension well skirt is attached to said outside edge of said auxiliary ski; and a second suspension well skirt attached between said belly pan and said inside edge of said auxiliary ski.

* * * * *

UNITED STATES PATENT AND TRADEMARK OFFICE
CERTIFICATE OF CORRECTION

PATENT NO.    : 6,382,337 B1
DATED         : May 7, 2002
INVENTOR(S)   : Ronald C. Kanan It is certified that error appears in the above-identified patent and that said Letters Patent is hereby corrected as shown below:

Title page,
Item [63], after "6,039,136." insert -- This application also claims the benefit of U.S. Provisional Application No. 60/122,898, filed on March 5, 1999. --

Column 1,
Line 5, after "6,039,136." insert -- This application also claims the benefit of U.S. Provisional Application No. 60/122,898, filed on March 5, 1999. --

Signed and Sealed this

Twenty-ninth Day of July, 2003

JAMES E. ROGAN
*Director of the United States Patent and Trademark Office*